Patented Apr. 12, 1949

2,467,132

UNITED STATES PATENT OFFICE 2,467,132

ALKYL SUBSTITUTED AROMATIC SULFONATES

Madison Hunt, Claymont, Del., Viktor Weinmayr, Pitman, N. J., and Albert Virgil Willett, Jr., Wilmington, Del., assignors to E. I. du Pont de Nemours & Company, Wilmington, Del., a corporation of Delaware No Drawing. Application October 15, 1947, Serial No. 780,098

4 Claims. (Cl. 260—505)

This invention deals with a group of alkyl-aromatic sulfonic acids and their salts useful as surface active agents, particularly as wetting agents.

It is an object of this invention to provide new surface active agents of superior properties.

The use of alkylated aromatic sulfonic acids as detergents and wetting agents is well known. Both sulfonated naphthalene and benzene derivatives have been indicated in the art, and the length of the alkyl chain has been varied from as low as 3 carbon atoms to as high as 20 carbon atoms, both straight-chain and branched-chain radicals being often employed.

We have now found that the limited group of compounds having the particular structure defined hereinbelow possesses outstanding qualities both as detergents and as wetting agents.

The novel compounds embraced in this invention are characterized by possessing a sulfonated benzene ring which is attached to a meso carbon atom of a normal alkane having from 11 to 13 carbon atoms. By meso carbon atom in this specification and in the claims below we mean the middle carbon atom in the case of an odd numbered alkyl radical, and one of the two central carbon atoms in the case of an even-numbered alkyl radical. In addition, the benzene ring may possess one or two methyl radicals. Altogether then, the compounds of this invention are defined by the formula

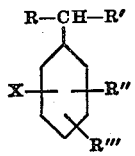

wherein R and R' are straight-chain alkyl radicals of 5 to 6 carbon atoms each, R'' and R''' designate hydrogen or methyl, while X represents the sulfonic acid radical or a salt thereof.

This invention embraces the above compounds in free acid form as well as in the form of water-soluble salts thereof, as obtained for instance by neutralizing the free acid with inorganic or organic bases. For the purpose of this invention, the term "water-soluble" shall be construed as meaning that the compound concerned is soluble in water to an extent of at least 0.2% by weight.

The products of this invention are prepared by sulfonating the corresponding hydrocarbon with oleum and, if desired, neutralizing the sulfonic acid thus formed with an alkali-metal hydroxide, an alkaline-earth hydroxide, or any other alkaline agent such as a primary, secondary or tertiary amine or a quaternary nitrogenous base. The alkylaromatic compounds themselves may be prepared by any suitable synthesis, such as the Friedel-Crafts reaction or reactions based on a Grignard synthesis. These methods of preparation are illustrated in the following examples, which however are given merely for illustrative purposes, without any intent to limit the invention thereby.

EXAMPLE I.—6-PHENYLDODECANE

A. *Preparation of the hydrocarbon*

To a suspension of 14.8 parts of magnesium in 1000 parts of boiling anhydrous ether are added 99.0 parts of n-hexyl bromide in 50 parts of anhydrous ether. The rate of addition is adjusted so that the heat of reaction keeps the mixture boiling gently. After addition is complete, the reaction mixture is refluxed for one-half hour. A solution of 88 parts of phenyl n-amyl ketone in 100 parts of anhydrous ether is then added over a period of one hour and the mixture is boiled an additional hour. The reaction mixture is poured into 2000 parts of water and acidified with hydrochloric acid. The upper layer is separated, washed with 5% sodium carbonate soluton and the ether is removed by evaporation. The residue is heated at 180° C. for 2 hours with 25 parts of potassium acid sulfate. The resulting product is distilled and the fraction boiling at 140–145° C. at 4mm. pressure is collected; it represents most probably a mixture of 6-phenyl-dodecene-5 and 6-phenyl-dodecene-6.

The reduction of the above product is carried out by subjecting a mixture of 60 parts of the product, 100 parts of glacial acetic acid and 0.1 part of platinum catalyst (Organic Synthesis vol. 1, page 452) to 3 atmospheres hydrogen pressure. After reduction is complete, the catalyst is removed by filtration and the acetic acid, by distillation. The crude product is washed three times with 10 parts of concentrated sulfuric acid. After a final wash with sodium carbonate solution, the product is distilled. 47 parts of 6-phenyl-dodecane are obtained. The product gives a refractive index $n_D^{20}=1.4802$ and a density of $$D_{20}^{20}=0.8526$$

B. *Sulfonation*

For sulfonation, 27 parts of 20% oleum is added slowly to 15 parts of the above described 6-phenyl-dodecane, with agitation and cooling so as to hold the mixture at a temperature of 20°–30° C. After all the oleum has been added, the temperature of the mixture is raised to 40–50° C. and held at this temperature for one-half hour. The product is poured into 90 parts of water, and 10 parts of alcohol are added in order to obtain a homogeneous solution. The mixture is neutralized to a pH of 7 to 8, with 20% sodium hydroxide solution. The entire mixture is drum-dried to yield 50 parts of a product, containing about 40% active ingredient and 60% sodium sulfate. The active ingredient may be isolated in a pure state by extraction of the 40% product with hot alcohol.

Instead of sodium hydroxide in the above example the corresponding equivalent weight of any other hydroxide or base which leads to a water-soluble sulfonate may be used, for instance potassium hydroxide, calcium hydroxide, magnesium hydroxide, ammonia, monomethylamine, dimethylamine, trimethylamine, tetramethylammonium hydroxide, the corresponding ethyl amines, the various ethanolamines (mono-, di- and tri-), etc.

EXAMPLE II

The procedure is the same as in Example 1, except that the 88 parts of phenyl n-amyl ketone are replaced by an equivalent quantity of any one of the following ketones: 2-methylphenyl n-amyl ketone, 3-methylphenyl n-hexyl ketone, 4-methylphenyl n-amyl ketone, 2,4-dimethylphenyl n-hexyl ketone, or 3,4-dimethylphenyl n-amyl ketone.

The products obtained are, respectively, the sodium sulfonates of: 6-o-tolyl-dodecane, 7-m-tolyl-tridecane, 6-p-tolyl-dodecane, 7-m-xylyl-tridecane, and 6-3′,4′-xylyl-dodecane.

EXAMPLE III.—6(3,4-DIMETHYLPHENYL)-UNDECANE

*Modified synthesis*

91 parts of n-hexyl bromide are reacted with magnesium in diethyl ether as in Example I, and 44.5 parts of ethyl-3,4-dimethyl benzoate are added. The rest of the procedure is as in Example I, including the hydrogenation step, and yields eventually a fraction having a refractive index, $n_D^{20}=1.4909$ and a density, $$D_{20}^{20}=0.8607$$

This product may then be subjected to sulfonation and, if desired, neutralization, in the same manner as in Example I.

EXAMPLE IV.—6(2,4-DIMETHYLPHENYL)-UNDECANE

The procedure is as in Example III, except that 44.5 parts of ethyl-2,4-dimethylbenzoate are employed in lieu of the 3,4-isomer therein specified. The hydrocarbon obtained has a boiling point of 119°–121° C. at 2 mm., a refractive index of $n_D^{20}=1.4880$ and a density of $$D_{20}^{20}=0.8593$$

The analysis shows C=87.34 and H=12.50 compared to the calculated values for $C_{19}H_{32}$ of C=87.63 and H=12.37.

The above product is sulfonated as described in Example I followed optionally by neutralization to give a water-soluble product of high wetting efficiency.

EXAMPLE V.—6-PHENYL-UNDECANE

This product is prepared as described in Example III, except for the substitution of 37.5 parts of ethylbenzoate for the ethyl ester therein mentioned. The hydrocarbon obtained (after hydrogenation) boils at 122°–124° C. at 3 mm. pressure. The compound has a refractive index of $n_D^{20}=1.4821$ and a density of $$D_{20}^{20}=0.8038$$

The analysis gives a value of C=87.57 and H=12.35. The calculated values for $C_{17}H_{28}$ are C=87.95 and H=12.05.

EXAMPLE VI.—7-PHENYL-TRIDECANE

The procedure is the same as in Example I, except that the 88 parts of phenyl n-amyl ketone therein specified are replaced by 37.5 parts of ethyl benzoate. The hydrocarbon obtained after hydrogenation boils at 136°–138° C. at 2 mm. pressure and gives a refractive index of $$n_D^{20}=1.4819$$

and a density of $$D_{20}^{20}=0.8529$$

The analysis shows C=88.29 and H=12.50, while the theoretical values for $C_{19}H_{32}$ are C=87.63 and H=12.37.

The product is sulfonated and optionally neutralized as described in Example I, to give a water-soluble sulfonate of high wetting efficiency.

EXAMPLE VII.—PREPARATION OF 6-PHENYLDODECANE BY ALKYLATION

To a mixture of 21 parts of anhydrous hydrogen fluoride and 40 parts of benzene in a copper vessel, 17 parts of dodecene-6 (prepared by dehydration of dodecanol-6) are slowly added with stirring and cooling, so as to hold the temperature of the reaction mass at 0–5° C. After 18 hours additional stirring at 0–5° C., the mixture is poured slowly into 500 parts of water. The upper layer is separated and washed with 5% sodium carbonate solution. The product has the same physical properties as the 6-phenyldodecane described in Example I.

Sulfonation and neutralization are carried out as described in Example I.

In a similar manner, any other of the compounds embraced within the scope of this invention may be prepared by condensing benzene, toluene or one of the xylenes, with one of the following olefines, namely undecene-5, dodecene-6 and tridecene-7.

EVALUATION OF THE PRODUCTS

The evaluation of the products of this invention for wetting power follows the method described in the AATC Year Book for 1946, page 230. The wetting power is gauged by the concentration in grams of active ingredient per liter of solution necessary to wet in 25 seconds. In Table I below, this concentration is designated as the standard wetting concentration. The superiority of the products of this invention over closely related compounds is shown in Table I below:

Table I

| Compound | Standard wetting concentration in g./l. |
|---|---|
| Sodium sulfonate of— | |
| 6-phenyldodecane | 0.25 |
| 6-phenylundecane | 0.51 |
| 7-phenyltridecane | 0.33 |
| 6-(3,4-dimethylphenyl)-undecane | 0.50 |
| 6-(2,4-dimethylphenyl)-undecane | 0.35 |
| 5-phenyldecane | 0.80 |
| 7-phenyltetradecane | over 1 |
| 2-phenyldodecane | 0.90 |
| 2-(p-methylphenyl)-dodecane | 0.90 |
| 1,4-di(1'-ethylbutyl)-benzene | 0.80 |

The last five compounds on Table I are outside the scope of this invention, and exhibit relatively poor qualities as wetting agents.

It will be understood that many variations are possible in the methods of synthesizing the novel compounds and in the choice of base for neutralizing the sulfonic acid groups. Apart from the last-mentioned freedom of variation, however, the number of compounds falling within the scope of this invention is limited by the general formula hereinabove set forth.

The products of this invention are outstanding wetting agents useful in the textile trade.

We claim as our invention:

1. A compound of the general formula

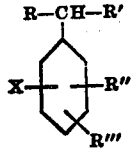

wherein R and R' are straight-chained alkyl radicals of 5 to 6 carbon atoms each, R'' and R''' are members selected from the group consisting of hydrogen and methyl, while X designates a radical selected from the group consisting of the sulfonic acid group and water-soluble salts thereof.

2. Compounds of the general formula

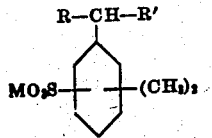

wherein R and R' are straight-chained alkyl radicals of 5 to 6 carbon atoms each, while M is an alkali metal.

3. Compounds of the general formula

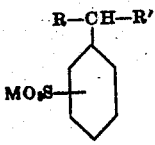

wherein R and R' are straight-chained alkyl radicals of 5 to 6 carbon atoms each, while M is an alkali metal.

4. The sodium sulfonate of 6-phenyl-dodecane.

MADISON HUNT.
VIKTOR WEINMAYR.
ALBERT VIRGIL WILLETT, JR.

REFERENCES CITED

The following references are of record in the file of this patent:

UNITED STATES PATENTS

| Number | Name | Date |
|---|---|---|
| 2,161,173 | Kyrides | June 6, 1939 |
| 2,199,131 | Flett | Apr. 30, 1940 |
| 2,244,512 | Brandt | June 3, 1941 |

OTHER REFERENCES

Suter, "Organic Chemistry of Sulfur," Wiley and Sons, New York, New York, 1944, page 206.